United States Patent Office 3,282,039
Patented Nov. 1, 1966

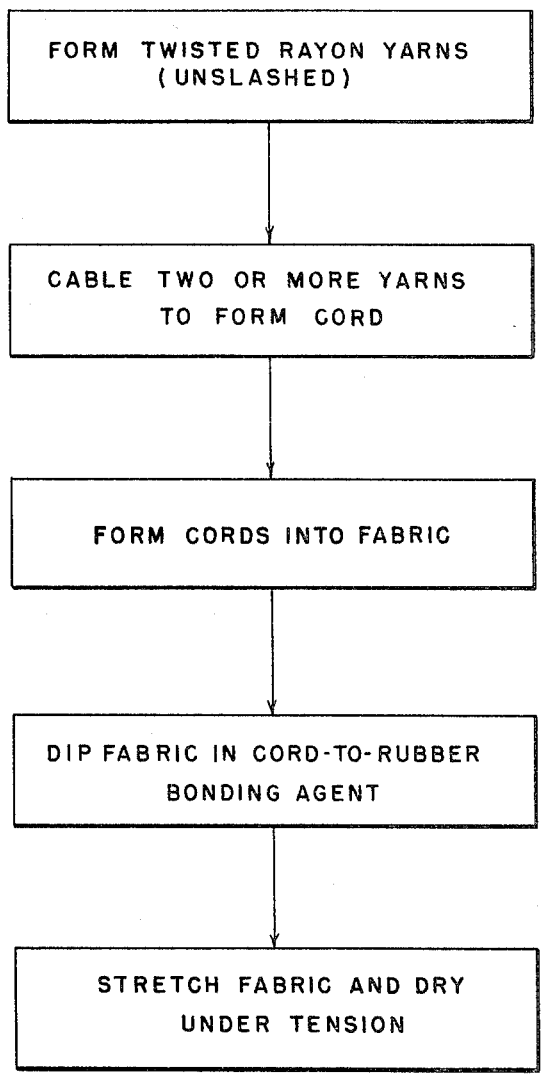

3,282,039
METHOD OF TREATING RAYON TIRE CORD
Charles J. Geyer, Jr., Berwyn, and James B. Curley, Wallingford, Pa., assignors to FMC Corporation, Philadelphia, Pa., a corporation of Delaware
Filed Sept. 6, 1963, Ser. No. 307,260
6 Claims. (Cl. 57—164)

This invention relates to a method of preparing rayon tire cord for incorporation into the rubber body of a vehicle tire, belting or the like and to a rayon cord reinforced vehicle tire having a greatly reduced rate of air diffusion along the length of the cords.

Vehicle tires comprise in general a carcass formed of fabric and a covering of rubber. In addition to providing a wearing surface, the rubber serves to protect the fabric from water and abrasion, which would have a deleterious effect on the fabric. The rubber is sometimes natural rubber, sometimes a synthetic and sometimes a mixture of the two and in the present application the term "rubber" is used in the generic sense. The fabric is formed of side-by-side cords and is either entirely weftless or held together by one or two picks or weft threads per linear inch. Various cord materials are used and the present invention is directed to the use of cords formed of rayon or regenerated cellulose.

Rayon tire cord is formed of two or sometimes three yarns cabled together. The individual yarns contain a few turns of twist, generally from nine to fifteen turns per inch, in one direction and when the yarns are cabled or twisted together to form the cord, the twist is inserted in the direction opposite to the twist in the yarns so that when the same number of turns are put into the cord as had been present in the yarns, the resultant cord is a structure consisting of twisted together bundles of filaments the individual bundles of which are substantially untwisted.

Newly extruded rayon has a relatively low tenacity and a relatively high extensibility, the term "extensibility" being used in the present specification to mean the percentage of stretch that may be imparted to it before it breaks. Thus if a ten inch length may be stretched to twelve inches before breaking, the extensibility is 20%. The extensibility is reduced by a slashing operation wherein the rayon is stretched while wet and held under tension until dry. This stretching of course reduces the diameter of the filaments but since it does not change the ultimate force required to break it, the tenacity, or strength per denier, is increased by the slashing operation. Rayon produced by the box spinning method is initially collected in the form of a low twist yarn and the normal practice, when this yarn is intended for use in making tire cord, is to slash it while in the low twist yarn form. Rayon produced on a so-called continuous spinning machine is also collected in the form of a low twist yarn but the slashing operation takes place prior to collection. Thus, whether the yarn is produced by the one method or the other, it is slashed prior to being cabled into a cord and the cord derives its high tenacity and low extensibility from the fact that it is formed of yarns having these properties.

The rubber of the vehicle tire, belting or the like will not adhere properly to what might be termed raw rayon tire cord. Therefore, before molding the rubber about the cord fabric, the fabric is coated with a fabric-to-rubber bonding agent, usually by dipping the fabric in a tank containing the bonding agent. The bonding agent is usually applied by the tire manufacturer and while the exact composition of the dip, as it is called, varies from manufacturer to manufacturer, a common dip is one known as RFL, the letters standing for resorcinol, formaldehyde and latex. The dip bath contains water and would cause the rayon cord to shrink and lose its low extensibility imparted by the above referred to slashing operation except for the fact that the cords of the fabric are maintained under tension during the dip and until dried. Some tire manufacturers actually impart some slight additional stretch to the yarn immediately after the dip but this stretch is no more than five percent and is done primarily to enable better control of the fabric as it passes through the equipment.

Amongst the causes of tire failure is inadequate adhesion of the rubber portion to the cord so that the tread rubber pulls away from the cord and pieces or chunks of the rubber actually fly off. Tire manufacturers have devised tests intended to quickly determine the likelihood of a tire failing from this cause. One of these tests involves overinflating the tire and pressing it under heavy load against a drum rotating at high speed. The tire will fail at the equivalent of about 3,000 miles in this test if the rayon cord is prepared as outlined above. There are various theories at to exactly why the tire fails, one theory involving diffusion of air along the cords. Natural rubber is somewhat pervious to air and it is believed that under load some of the air within the tire gradually migrates through the rubber and comes into contact with the cord and with ordinary rayon tire cord this air then wicks or diffuses lengthwise of the cords and gradually collects in one or more pockets and upon a rise in temperature explodes, thus forcing the rubber to break away from the cord. When the cord is prepared as hereinafter explained, air diffusion lengthwise of the cords is substantially eliminated and the tire does not fail until it has traveled the equivalent of 7,000 miles or more. It should be mentioned that these mileage figures do not of course represent the actual miles that the tire will travel in anything like normal use.

It is therefore an object of the present invention to provide an improved method of preparing rayon tire cord for incorporation into a rubber body such as a vehicle tire.

A more particular object of the invention is to provide a new method of preparing rayon tire cord for incorporation into a vehicle tire which results in a more permanent bonding of the rubber portion of the tire to the cord.

Another object of the invention is to provide an improved rayon cord reinforced vehicle tire wherein diffusion of air lengthwise of the cords is greatly reduced or substantially eliminated.

Other objects, features and advantages of the invention will become apparent as the description of a preferred embodiment thereof proceeds.

The drawing is a flow diagram showing the steps of the method.

According to the present invention the yarn is spun and collected in the usual manner but it is not slashed; so that it has a relatively low tenacity and a relatively high elongation. Thus if the yarn is spun on a continuous machine, the slashing operation is omitted and if it is box spun, the operation is completely as usual up to and through initial collection. As previously mentioned the initially collected yarn has a quite low twist and therefore before cabling into the cord form, the yarns are given an additional twist to bring the total twist up to from about nine to fifteen turns per inch. A plurality of these yarns, usually two or three of them, are cabled or twisted together, the twisting being done in the direction opposite to the twist of the individual yarns whereby a twisted cord is formed. If the same number of turns of twist are put into the cord as was in the yarns the twisting of the yarns together removes the twist from the individual yarns whereby the cord consists of twisted-together bundles of filaments, the filaments of the individual bundles being substantially untwisted. There are other known methods of forming cord wherein the yarns are not pretwisted or are twisted simultaneously with the cabling. So far as the present invention is concerned, the important point is that the cord is formed of unslashed yarns.

The thus formed cords of course have an extensibility equal to the natural extensibility of the individual yarns plus additional extensibility provided by the fact that the yarns are twisted around one another. A plurality of such cords are then arranged side-by-side and held in this arrangement by picks of threads woven through them at approximately half-inch intervals to thus form a tire cord fabric.

In order to enable the rubber of the finished tire to adhere to the cord fabric the fabric is led through a dip tank containing a suitable cord-to-rubber bonding agent, for example the RFL dip referred to above. Upon removal from the dip the fabric is stretched at least 10%, preferably about 20%, to reduce the extensibility of the cords to the desired value and to accordingly substantially increase the tenacity of the yarn. This stretching of course decreases the diameter of the individual filaments making up the cord and also compacts the filaments of each yarn and the yarns themselves whereby the thus stretched cord has substantially less air space between the yarns and the filaments. At the same time that the stretching compacts the yarns together to squeeze out of air, the bonding agent is squeezed into the interior portion of the cord to thus produce a substantially denser fabric than is the case with the heretofore followed procedure. If desired, instead of imparting the full stretch after the fabric is removed from the dip it may be partially stretched while in the dip and then the remaining stretch imparted after removal from the dip, or the full stretch may be imparted in the dip tank itself.

As mentioned above, when the fabric prepared in this manner is incorporated into a vehicle tire the bonding of the rubber to the cord is very substantially improved. A noticeable improvement takes place when the stretch is at least 10% but that at the full 20% stretch the improved bonding is most strikingly apparent.

If the tire manufacturer desires that the cord as incorporated into the tire contain say 10 turns of twist per inch and have an elongation of 10% then the cord manufacturer will supply him with a cord containing 12 turns per inch and having an elongation of about 30%. Then when the cord fabric is stretched 20% the number of turns per inch will be reduced from 12 to 10 and the elongation will be reduced from 30% to 10%. Of course, different tire manufacturers will specify different degrees of twist and elongation but in any event if the amount of stretch to be given to the fabric is known the cord can be supplied with the right amount of twist and elongation so as to have the specified values after the cord has been stretched. The cord supplied will also have a higher denier so that after stretching the cord denier will be the same as it would have been if formed of previously slashed yarns.

The vehicle tire itself is made in the usual way from this improved cord and the resultant tire constitutes one of the features of the present invention. As previously mentioned, the diffusion of air along the cords is substantially eliminated or at least reduced greatly below any previously known rayon cord reinforced tire. There is no known way of determining absolutely the actual amount of air diffusion along the cords in the tire itself but a satisfactory indication of this property can be obtained by a special test procedure, as will now be explained. Twenty-six rayon tire cords made of 2 ply, 1100 denier/980 filament yarns twisted 14 turns by 14 turns per inch are embedded in a rubber block approximately three inches long with the cords arranged side-by-side and the ends of the cords exposed at the ends of the rubber block. The block is held against movement and approximately 60 pounds per square inch of air pressure applied to one end. By measuring the air emerging from the other end of the block the diffusion along the cords is determined, since the rubber block itself, without the cords, is effective to prevent passage of air entirely. With this test, it has been found that the amount of air transmitted through the test block is anywhere from about 8 to about 80 cubic centimeters per hour if the cord is prepared by the ordinary methods hereinbefore referred to. When the cord is prepared in accordance with the present invention with the full 20% stretch, less than 1.0 cubic centimeter of air per hour is transmitted through the test block, the actual amount of air varying in the tests from 0.2 to 0.8 cubic centimeter per hour. The particular size cord used in the test was selected only because it is a typical size and of course a corresponding test could be made using a different number of cords, a different air pressure and a different length block. Different test conditions would of course affect the reading as to the actual amount of air transmitted but it is believed that the particular test described enables the invention to be defined inasmuch as a vehicle tire having rayon cords wherein less than 1.0 cubic centimeter of air is transmitted under these conditions is one of the novel features of this invention.

Having thus described the invention, what is claimed is:

1. The method of preparing rayon tire cord for incorporation into a rubber body as a reinforcing agent comprising making a rayon tire cord having a substantially higher extensibility than desired in the finished product, wetting the cord with an aqueous solution of a cord-to-rubber bonding agent, stretching the cord while wet at least 10% to reduce the extensibility to the point desired in the finished product, and drying the cord while maintaining it in the stretched condition.

2. The method set forth in claim 1 wherein the cord is stretched about 20%.

3. The method of preparing rayon tire cord for incorporation into a rubber body as a reinforcing agent comprising spinning a plurality of rayon tire yarns, twisting the yarns, cabling the yarns together in the direction opposite the twist to form a cord the individual yarns of which are substantially untwisted, wetting the cord with an aqueous solution of a cord-to-rubber bonding agent, stretching the cord at least 10% while wet, and drying the cord while maintaining it in the stretched condition.

4. The method set forth in claim 3 wherein the cord is stretched about 20% and maintained in that condition while being dried.

5. The method of preparing rayon tire cord for incorporation into a rubber body as a reinforcing agent comprising twisting bundles of rayon filaments to form yarns, cabling a plurality of the yarns together in the direction opposite the twist to form a cord, making a fabric of a multiplicity of cords, wetting the fabric with an aqueous solution of a cord-to-rubber bonding agent, stretching the fabric while wet to elongate the cords at least 10%, and drying the fabric while maintaining it in the stretched condition.

6. The method set forth in claim 5 wherein the fabric is stretched about 20%.

References Cited by the Examiner

UNITED STATES PATENTS

| | | | |
|---|---|---|---|
| 2,154,204 | 4/1939 | Hoff et al. | 57—157 |
| 2,254,741 | 9/1941 | Hansen et al. | 57—139 |
| 2,317,911 | 4/1943 | Hoff | 152—359 |
| 2,436,980 | 3/1948 | Standley et al. | 152—359 |
| 2,606,844 | 8/1952 | Wilson et al. | 57—164 X |
| 2,645,266 | 7/1953 | Muller et al. | 152—359 |
| 2,679,088 | 5/1954 | Meherg et al. | 28—74 |
| 2,775,860 | 1/1957 | Morrison | 57—164 X |
| 2,905,222 | 9/1959 | Koch | 152—362 |
| 2,943,664 | 7/1960 | Baldwin | 152—359 |
| 2,952,078 | 9/1960 | Litzler | 26—68 X |
| 3,018,610 | 1/1962 | Kleinekathofer | 57—157 |
| 3,064,414 | 11/1962 | Ando | 57—164 X |

FRANK J. COHEN, *Primary Examiner.*

MERVIN STEIN, *Examiner.*